United States Patent [19]

Pedain et al.

[11] Patent Number: 4,656,243

[45] Date of Patent: Apr. 7, 1987

[54] NEW POLYESTER POLYOLS AND THEIR USE AS POLYOL COMPONENT IN TWO-COMPONENT POLYURETHANE LACQUERS

[75] Inventors: Josef Pedain, Cologne; Klaus König; Manfred Schönfelder, both of Leverkusen, all of Fed. Rep. of Germany

[73] Assignee: Bayer Aktiengesellschaft, Leverkusen, Fed. Rep. of Germany

[21] Appl. No.: 737,603

[22] Filed: May 24, 1985

[30] Foreign Application Priority Data

Jun. 7, 1984 [DE] Fed. Rep. of Germany ....... 3421122

[51] Int. Cl.$^4$ .............................................. C08G 63/16
[52] U.S. Cl. .................................... 528/302; 528/305; 528/288
[58] Field of Search ........................ 528/302, 305, 288

[56] References Cited

U.S. PATENT DOCUMENTS

| | | | |
|---|---|---|---|
| 3,932,357 | 1/1976 | Schmitt et al. | 260/75 NH |
| 4,205,115 | 5/1980 | Piccirilli et al. | 428/334 |
| 4,247,678 | 1/1981 | Chung | 528/83 |
| 4,400,477 | 8/1983 | Blanpied | 528/302 X |
| 4,525,574 | 6/1985 | Altounian | 528/302 X |
| 4,540,771 | 9/1985 | Ambrose et al. | 528/302 X |

FOREIGN PATENT DOCUMENTS 2407495 11/1974 Fed. Rep. of Germany .

OTHER PUBLICATIONS

"Lackkunstharze" Hans Wagner/Hans Friederich Sarx, Carl Hanser Verlag, Munich, pp. 153 to 173, 1971.

*Primary Examiner*—Lucille M. Phynes
*Attorney, Agent, or Firm*—Gene Harsh; Joseph C. Gil; Thomas W. Roy

[57] ABSTRACT

The present invention relates to polyester polyols having a hydroxyl number of about 80 to 250, containing reaction products of (a) 54 to 58 mol % of a polyol component and
(b) 46 to 42 mol % of a dicarboxylic acid component, characterized in that
(a) the polyol component contains (i) about 70 to 90 mol % of hexane-1,6-diol and (ii) about 10 to 30 mol % of at least one higher valent alcohol selected from trimethylolpropane, glycerol, pentaerythritol and mixtures of these polyols, and
(b) the dicarboxylic acid component contains (iii) about 50 to 80 mol % of isophthalic acid, (iv) about 20 to 30 mol % of at least one dicarboxylic acid of the formula HOOC—$(CH_2)_n$—COOH (n=an integer from 2–8) and (v) 0 to about 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

The invention also relates to the use of these polyester polyols as the binder component for two-component polyurethane lacquers containing lacquer polyisocyanates for the production of lacquer coatings on molded plastics parts.

4 Claims, No Drawings

NEW POLYESTER POLYOLS AND THEIR USE AS POLYOL COMPONENT IN TWO-COMPONENT POLYURETHANE LACQUERS

BACKGROUND OF THE INVENTION

1. Field of the Invention

The present invention relates to new polyester polyols based on selected starting materials and to their use in combination with certain lacquer polyisocyanates as binders or binder components in two-component polyurethane lacquers for the coating of molded plastics parts.

2. Description of the Prior Art

It has long been known to coat relatively inflexible substrates such as metal or wood with two-component polyurethane lacquers based on hydroxyl-containing polyesters, polyethers or polyacrylates and organic polyisocyanates. The resulting lacquer coats are distinguished in particular by their excellent hardness, very good adherence and unsurpassed weather resistance. The chemical basis of these lacquers and coatings has been described inter alia in "Lackkunstharze" Hans Wagner/Hans Friederich Sarx, Carl Hanser Verlag, Munich, pages 153 to 173, 1971.

The two-component polyurethane lacquers known in the art, however, frequently result in highly cross-linked lacquer coats which in many cases have insufficient elasticity to meet the requirements of coatings on flexible substrates. It is particularly in the construction of motor vehicles that flexible plastics parts are being used to an increasing extent for the purpose of improved safety. Thus, for example, in some countries, motor vehicles must be equipped with bumpers capable of absorbing an impact against a solid barrier at a certain velocity (e.g. 5 MPH) without damage and at the same time functional parts such as headlights, flashing lights, doors and hoods must be unimpaired in their function. Due to these and other more far-reaching requirements, the metal bumpers hitherto used in many countries have been abandoned in the construction of passenger cars and replaced by complete front and rear parts made of highly flexible materials capable of meeting the requirements that the bumper should recoil after impact and be left undamaged (prevention of damage in minor accidents).

The highly flexible plastics materials which have proved to be suitable for this purpose include inter alia semi-rigid elastomeric polyurethanes (e.g. Bayflex types from BAYER AG, Leverkusen) produced from two-component polyurethane-forming mixtures by the reaction injection molding technique in closed molds, optionally with foaming; thermoplastic polyurethanes (e.g. Desmopan types from BAYER AG or Texin types from Mobay Chemical Corporation, Pittsburgh, USA) which are worked up by the injection molding technique, as well as various types of rubbers.

Plastics parts based on these chemical raw materials, which have for some years now belonged to the state of the art in the construction of motor vehicles, are relatively large and therefore to a significant extent determine the appearance of the vehicle. For these reasons, lacquering of the unfinished parts is necessary. To this is added the fact that the surface of the plastics materials are degraded on exposure to weathering and must therefore be protected against weathering influences. Elastic lacquer coats are, however, also necessary for less elastic plastics parts to prevent mechanical damage to the parts. Thus, for example, rigid but tough thermoplasts must be lacquered with highly elastic, extremely resistant lacquers in order to prevent tearing of the lacquer film as a result of mechanical damage or other external influences and propagation of the tears through the solid plastics material. The lacquer coats, and especially the top lacquer coat on such parts must therefore meet much higher standards than a conventional lacquer coat.

It was therefore an object of the present invention to provide a new two-component polyurethane lacquer system which would satisfy these special requirements and in particular would be optimally suitable for the lacquering of elastic plastics parts. The new lacquer system should in particular satisfy the following requirements:

1. Low temperature elasticity:
   The film must not tear under the above-mentioned velocities of impact even at $-25°$ C. The mechanical properties of the plastics material should as much as possible be left unimpaired by the lacquer coating.
2. Good gloss retention:
   The lacquer film on the plastics parts should be as durable as possible. It must not be degraded more rapidly under weathering conditions than the film on the car body.
3. No subsequent increase in brittleness on exposure to weathering:
   Even after prolonged weathering the film must not become more brittle, i.e. the low temperature elasticity should not be reduced in the course of weathering.
4. Low drying temperature:
   The heat resistance of such large plastics parts is limited. The drying temperatures and times required should be low not only for this reason but also for the sake of saving energy.
5. Repairability:
   The drying conditions of such a system should enable not only the initial lacquering but also repair lacquering to be carried out at 80° C. or room temperature.

Although highly flexible lacquers which are perfectly satisfactory in their elasticity and cold flexibility can be produced from the known two-component systems of the state of the art, this is due mainly to the use, as the main polyol component, of certain polyhydroxyl polyesters synthesized predominantly from aliphatic dicarboxylic acids and aliphatic diols and having a hydroxyl functionality which may be slightly, but not significantly above 2. The disadvantage of two-component polyurethane lacquers based on such polyester diols and the conventional lacquer polyisocyanates is that the lacquer coatings obtained are much too soft, i.e. they have insufficient surface hardness. The weather resistance particularly, and the resistance to chalking and hence the gloss retention of coatings produced from such lacquer systems are completely inadequate.

The so-called one-pack coating compounds described in the patent literature (e.g. DE-OS No. 2 407 495), which contain inter alia a urethanized polyester polyol and, as cross-linking component, a melamine formaldehyde resin, for example, and which are particularly suitable for lacquer coating rubber-like, springy substrates (such as foams of polyurethanes or natural or synthetic rubber) are also not optimally suited for lacquering parts of motor vehicles for which the above-mentioned requirements are applicable. One particular disadvantage is that hardening of the lacquers is required to be carried out at elevated temperatures, with the result that the molded plastics parts, which frequently only have a low heat resistance, undergo deformation during stoving of the lacquer.

It has not surprisingly been found that these problems may be solved by using the polyester polyols according to the invention described below as a portion or all of the polyhydroxyl component in two-component polyurethane lacquers.

SUMMARY OF THE INVENTION

The present invention relates to polyester polyols having a hydroxyl number of about 80 to 250, containing reaction products of (a) 54 to 58 mol % of a polyol component and
(b) 46 to 42 mol % of a dicarboxylic acid component, characterized in that
  (a) the polyol component contains (i) about 70 to 90 mol % of hexane-1,6-diol and (ii) about 10 to 30 mol % of at least one higher valent alcohol selected from trimethylolpropane, glycerol, pentaerythritol and mixtures of these polyols, and
  (b) the dicarboxylic acid component contains (iii) about 50 to 80 mol % of isophthalic acid, (iv) about 20 to 30 mol % of at least one dicarboxylic acid of the formula HOOC—$(CH_2)_n$—COOH (n=an integer from 2–8) and (v) 0 to about 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

The invention also relates to the use of these polyester polyols as the binder component for two-component polyurethane lacquers containing lacquer polyisocyanates for the production of lacquer coatings on molded plastics parts.

DETAILED DESCRIPTION OF THE INVENTION

Preferably the percentages under (a) and (b) add up to 100 in each case. The special suitability of the polyester polyols according to this invention for the use according to the invention is due to the selection made according to the invention of the starting materials on which the polyester polyols are based and of the quantitative proportions in which they are used. The polyester polyols according to the invention have hydroxyl numbers within the range of about 80 to 250, preferably about 120 to 200, acid numbers below about 12, preferably about 1.0 to 10, and an average molecular weight (calculated from the stoichiometry of the starting materials used) of about 800 to 4,000, preferably about 800 to 2,000. The polyester polyols according to the invention are highly viscous, colorless to light yellow, clear resins which are soluble to form clear solutions in lacquer solvents, for example, hydrocarbons such as toluene, xylene or higher alkyl benzenes; esters such as ethyl acetate, butyl acetate, methyl glycol acetate, ethyl glycol acetate or methoxypropyl acetate; and ketones such as methyl ethyl ketone or methyl isobutyl ketone or mixtures thereof.

Another essential feature of the invention is that the polyhydroxypolyester polyols according to the invention have been prepared from the above mentioned, selected starting components (a) and (b). Particularly preferred polyester polyols according to the invention are the corresponding reaction products based on (a) hexane-1,6-diol and trimethylolpropane and (b) isophthalic acid, adipic acid and optionally phthalic acid or phthalic acid anhydride.

Preparation of the polyesters according to the invention is carried out in known manner by methods which have been fully described, for example in "Ullmanns Enzyklopädie der Technischen Chemie", Verlag Chemie Weinheim, 4th Edition (1980), Volume 19, pages 61 et seq, or by H. Wagner and H. F. Sarx in "Lackkunstharze", Carl Hanser Verlag, Munich (1971), pages 86–152. Esterification is optionally carried out in the presence of a catalytic quantity of a conventional esterification catalyst, e.g. acids, bases or transition metal compounds such as titanium tetrabutylate, at about 80° to 260° C., preferably about 100° to 200° C. The esterification reaction is continued until the desired values for the hydroxyl number and acid number are reached. The molecular weight of the polyester polyols according to the invention may be calculated from the stoichiometry of the starting materials (taking into account the resulting hydroxyl and acid numbers).

When the polyester polyols according to the invention are used for the purpose according to the invention, they are optionally put into the process in admixture with other organic polyhydroxyl compounds known from polyurethane lacquer technology as polyhydroxyl components. These other polyhydroxyl compounds may be any of the conventional polyester polyols, polyether polyols or polyacrylate polyols, but if any such organic polyhydroxyl compounds are to be used at all in addition to the polyester polyols according to the invention, it is preferred to use the polyacrylate polyols known in the art.

The polyacrylate polyols used as such additional components should be soluble in the lacquer solvents exemplified above and may suitably be based on copolymers of 2-hydroxyethyl acrylate and/or 2- or 3-hydroxypropyl (meth)acrylate with other olefinically unsaturated monomers, e.g. methyl acrylate, methyl methacrylate, styrene, acrylic acid, acrylonitrile, methacrylonitrile or the like. The hydroxyl group content of these polyacrylate polyols is generally about 1 to 5% by weight. When the polyester polyols according to the invention are used for the purpose of the invention, they may be put into the process as mixtures with up to about 90 hydroxyl equivalents-%, preferably up to about 50 hydroxyl equivalents-%, based on all the polyhydroxyl compounds, of other polyols of the type exemplified above. It is particularly preferred, however, to use the polyester polyols according to the invention as to the sole polyol component for the purpose according to the invention.

When the polyester polyols according to the invention are used for the purpose according to the invention, the components used as reactants for the polyol component are the usual "lacquer polyisocyanates", i.e. especially the known isocyanate compounds which contain urethane groups or in particular biuret groups or isocyanurate groups and are modification products of simple diisocyanates such as 1,6-diisocyanatohexane, 1-isocyanato-3,3,5-trimethyl-5-isocyanatomethylcyclohexane (isophorone diisocyanate), 4,4'-diisocyanatodicyclohexyl methane, 2,4-diisocyanatotoluene and mixtures thereof with up to 35% by weight, based on the total mixture, of 2,6-diisocyanatotoluene, or mixtures of these compounds. "Lacquer polyisocanates" of this kind having aliphatically and/or cycloaliphatically bound isocyanate groups are particularly preferred.

"Lacquer polyisocyanates" containing urethane groups include in particular the reaction products of 2,4- and optionally 2,6-diisocyanatotoluene with subequivalent quantities of trimethylolpropane or mixtures thereof with simple diols such as the isomeric propane or butane diols. The preparation of such lacquer polyisocyanates containing urethane groups in a form virtually free from monomers has been described, for example, in DE-PS No. 1 090 196.

The lacquer polyisocyanates containing biuret groups, which are particularly preferred for the use according to the invention, include in particular those based on 1,6-diisocyanatohexane, the preparation of which has been described, for example, in Nos. EP-Bl-000 3505, DE-PS 1 101 394, U.S. Pat. Nos. 3,358,010 and 3,903,127.

The polyisocyanates with isocyanurate groups, which are also preferred, include in particular the isocyanurate group-containing trimers or cotrimers of the diisocyanates exemplified above, e.g. the isocyanurate group-containing polyisocyanates based on diisocyanatotoluene according to GB-PS Nos. 1 060 430, 1 506 373 or 1 458 564, the cotrimers of diisocyanatotoluenes with 1,6-diisocyanatohexane, which are obtainable, for example, according to Nos. DE-PS 1 644 809 or DE-OS 3 144 672, and in particular the aliphatic and aliphatic-cycloaliphatic trimers and cotrimers based on 1,6-diisocyanatohexane and/or isophorone diisocyanate, which may be obtained, for example, according to U.S. Pat. Nos. 4,324,879, 4,288,586, Nos. DE-OS 3 100 262, 3,100,263, 3 033 860 or 3 144 622. The lacquer polyisocyanates used for the purpose according to the invention generally have an isocyanate content of about 5 to 25% by weight and contain a residue of preferably less than 2% by weight of the monomeric diisocyanates used for their preparation. Any mixtures of the lacquer polyisocyanates exemplified above may, of course, be used.

In the two-component polyurethane lacquers used for the purpose according to the invention, the polyol component and the polyisocyanate component are present in quantities corresponding to an equivalent ratio of isocyanate groups to hydroxyl groups of about 10:1 to 1:2, preferably about 1.5:1 to 1:1.2. The two-component binders obtained by mixing the two components are workable for only a limited time of about 2 to 48 hours and are worked up either as such (solvent-free clear lacquers) or, preferably, with the addition of the usual auxiliary agents and additives. These auxiliary agents and additives optionally used may be added either to the mixture or to the individual components before they are mixed.

The auxiliary agents and additives may include solvents such as ethyl acetate, butyl acetate, methyl ethyl ketone, methyl isobutyl ketone, ethylene glycol monoethyl ether acetate, methoxypropyl acetate, toluene, xylene, white spirit or any mixtures of these solvents.

The solvents are used in a quantity of up to abut 70% by weight, preferably up to about 40% by weight, based on the total quantity of mixture.

Other auxiliary agents and additives optionally used include plasticizers such as tricresyl phosphate or diesters of phthalic acid, chloroparaffins, pigments and fillers such as titanium oxide, barium sulphate, chalk and carbon black; catalysts such as N,N-dimethylbenzylamine, N-methylmorpholine, lead octoate and dibutyl tin dilaurate; leveling agents; thickeners; optionally stabilizers such as substituted phenols, organofunctional silanes as bonding agents, and light-protective agents. These light-protective agents, may be, for example, sterically hindered amines, as described inter alia in DE-OS No. 2 417 353 (=U.S. Pat. Nos. 4,123,418 and 4,110,304) and DE-OS No. 2 456 864 (=U.S. Pat. Nos. 3,993,655 and 4,221,701). The following compounds are particularly preferred:
Bis-(1,2,2,2,6,6-pentamethyl-piperidyl-4)-sebacate, bis-(2,2,6,6-tetramethyl-piperidyl-4)-sebacate, and the bis-(1,2,2,6,6,-pentamethyl-piperidyl-4) ester of n-butyl-(3,5-di-tert.-butyl-4-hydroxybenzyl)-malonic acid.

The moisture adhering to the fillers and pigments may be removed by previous drying or by including water absorbent substances such as molecular sieve zeolites.

Drying of the lacquer films obtained from the use according to the invention may be carried out at room temperature and the optimum properties mentioned above may be obtained without any increase in temperature but since drying proceeds relatively slowly at room temperature it is frequently advisable to raise the temperature to about 60° to 120° C., preferably about 80° to 100° C. for a period of from 20 to 40 minutes. Although a higher drying temperature is possible and the stoving process may thus be shortened, this entails the risk of deformation of the plastics parts which have been coated with the lacquer.

The lacquers to be used according to the invention are suitable particularly for the lacquering of plastics materials but may also be used for metals and other substrates. The lacquers to be used according to the invention are particularly advantageous for lacquering flexible plastics parts such as those used in the construction of motor vehicles. Since the lacquers used according to the invention are equally suitable for lacquering plastics and metals, they are eminently suitable for lacquering constructions such as the external parts of motor vehicles which are produced by modern methods of mixed construction from plastics and metal parts. The special advantages of the lacquers to be used according to the invention render these lacquers particularly suitable for this "on line" method of lacquering, especially for the external parts of motor vehicles. Since hardening of the lacquer films can be achieved at low temperatures, the plastics materials are not subjected to any undue temperature stresses, and since the resulting lacquer films have excellent weathering resistance and elasticity, the decorative lacquer coats can be preserved over long periods and remain undamaged by knocks and impacts. Particularly to be mentioned in this connection is the excellent resistance to the impact of falling stones and gravel of the top coat lacquers produced according to the invention on motor vehicles. Lacquer films obtained from the two-component lacquers used according to the invention optimally fulfill two basically contradictory requirements, namely excellent low temperature elasticity with high gloss retention.

The lacquers used according to the invention may, of course, be applied to the substrates by any conventional methods of lacquer technology such as spread coating, spraying or dip coating. The lacquers according to the invention are suitable both as primers and for forming intermediate layers and for producing the top layers on the substrates to be lacquered.

The invention is further illustrated, but is not intended to be limited by the following examples in which all parts and percentages are by weight unless otherwise specified.

EXAMPLES

General method of preparation for the polyester polyols:

The components were weighed into a reactor equipped with stirrer, heating means, automatic temperature control, column and receiver and heated to 100°–150° C. to form an inhomogeneous, but readily stirrable melt. After 1 to 2 hours the temperature was gradually raised to 200° C. in the course of 4 to 8 hours while water was distilled off. In the course of this procedure, the melt became homogeneous and clear. A catalytic quantity of a conventional transesterification catalyst (titanium tetrabutylate) was then added and esterification was continued at 200° C. under reduced pressure. The pressure was lowered to 10–20 mbar in the course of 6 to 8 hours and stirring was continued under these conditions until the desired acid number had been reached.

Colorless to slightly yellow soft resins which form clear solutions in conventional lacquer solvents were obtained.

The composition and data of the individual polyesters prepared by this method are given in Examples 1 to 12.

EXAMPLE 1 (according to the invention)

| Polyester of | |
|---|---|
| 4.75 mol of hexane-1,6-diol | 560.0 g |
| 2.0 mol of glycerol | 184 g |
| 2.9 mol of isophthalic acid | 481.4 g |
| 1.7 mol of azelaic acid | 320 g |
| 1.15 mol of terephthalic acid | 191 g |
| Hydroxyl number: 149 | |
| Acid number: 8 | |
| Average functionality: about 4 | |
| Average molecular weight: about 1,530. | |

The polyester contained 54 mol-% of polyols and 46 mol-% of dicarboxylic acids. 70.4 mol-% of the polyol component consisted of hexane-1,6-diol and 50.4 mol-% of the acid component consisted of isophthalic acid.

EXAMPLE 2 (according to the invention)

| Polyester of | |
|---|---|
| 3.7 mol of hexane-1,6-diol | 436.6 g |
| 0.5 mol of glycerol | 46 g |
| 0.46 mol of trimethylolpropane | 61.6 g |
| 2.36 mol of isophthalic acid | 391.8 g |
| 0.75 mol of succinic acid | 88.5 g |
| 0.55 mol of hexahydrophthalic acid anhydride | 84.7 g |
| Hydroxyl number: 164 | |
| Acid number: 3 | |
| Average functionality: about 2.9 | |
| Average molecular weight: about 980. | |

The polyester contained 56 mol-% of polyols and 44 mol-% of dicarboxylic acids. 79.4 mol-% of the polyol component consisted of hexane-1,6-diol and 64.5 mol-% of the acid component consisted of isophthalic acid.

EXAMPLE 3 (according to the invention)

| Polyester of | |
|---|---|
| 3.225 mol of hexane-1,6-diol | 380.6 g |
| 0.4 mol of pentaerythritol | 54.4 g |
| 2.1 mol of isophthalic acid | 348.6 g |
| 0.525 mol of sebacic acid | 106.2 g |
| Hydroxyl number: 187 | |
| Acid number: 5 | |
| Average functionality: about 2.8 | |
| Average molecular weight: about 800. | |

The polyester contained 58 mol-% of polyols and 42 mol-% of dicarboxylic acids. 89% of the polyol component consisted of hexane-1,6-diol and 80% of the acid component consisted of isophthalic acid.

EXAMPLE 4 (according to the invention)

| Polyester of | |
|---|---|
| 4.4 mol of hexane-1,6-diol | 519.2 g |
| 1.1 mol of trimethylolpropane | 147.4 g |
| 2.7 mol of isophthalic acid | 448.2 g |
| 1.1 mol of adipic acid | 160.6 g |
| 0.7 mol of tetrahydrophthalic acid anhydride | 106.4 g |
| Hydroxyl number: 138 | |
| Acid number: 4 | |
| Average functionality: about 3.1 | |
| Average molecular weight: about 1,230. | |

The polyester contained 55 mol-% of polyols and 45 mol-% of dicarboxylic acids. 80 Mol-% of the polyol component consisted of hexane-1,6-diol and 60 mol-% of the acid component consisted of isophthalic acid.

EXAMPLE 5 (according to the invention)

| Polyester of | |
|---|---|
| 4 mol of hexane-1,6-diol | 472 g |
| 1 mol of trimethylolpropane | 134 g |
| 2.5 mol of isophthalic acid | 415 g |
| 0.5 mol of phthalic acid anhydride | 74 g |
| 1 mol of adipic acid | 146 g |
| Hydroxyl number: 143 | |
| Acid number: 3 | |
| Average functionality: about 3 | |
| Average molecular weight: 1,100. | |

The polyester contained 55.6 mol-% of polyols and 44.4 mol-% of dicarboxylic acids. 80 Mol-% of the polyol component consisted of hexane-1,6-diol and 62.5 mol-% of the carboxylic acid component consisted of isophthalic acid.

EXAMPLE 6 (according to the invention)

| Polyester of | |
|---|---|
| 4 mol of hexane-1,6-diol | 472 g |
| 1 mol of trimethylolpropane | 134 g |
| 3 mol of isophthalic acid | 498 g |
| 1 mol of adipic acid | 146 g |
| Hydroxyl number: 148 | |
| Acid number: 1.8 | |
| Average functionality: 3 | |
| Average molecular weight: 1,170. | |

The polyester contained 55.6 mol-% of polyols and 44.4 mol-% of dicarboxylic acids. 80 Mol-% of the polyol component consisted of hexane-1,6-diol and 75 mol-% of the carboxylic acid component consisted of isophthalic acid.

EXAMPLE 7 (according to the invention)

Polyester of
| | |
|---|---|
| 4.5 mol of hexane-1,6-diol | 531 g |
| 1.5 mol of trimethylolpropane | 201 g |
| 3.5 mol of isophthalic acid | 581 g |
| 1 mol of glutaric acid | 132 g |
| 0.5 mol of phthalic acid anhydride | 74 g |
| Hydroxyl number: 142 | |
| Acid number: 2.6 | |
| Average functionality: about 3.5 | |
| Average molecular weight: about 1,350. | |

The polyester contained 54.5 mol-% of polyols and 45.5 mol-% of dicarboxylic acids. 75 Mol-% of the polyol component consisted of hexane-1,6-diol and 70 mol-% of the carboxylic acid component consisted of isophthalic acid.

EXAMPLE 8 (Comparison)

Polyester of
1 mol of phthalic acid anhydride
2 mol of hexahydrophthalic acid anhydride
3.45 mol of trimethylolpropane
Hydroxyl number: 260
Acid number: 4
Average functionality: 9–10
Average molecular weight: 1,900

EXAMPLE 9 (Comparison)

Polyester of
5.4 mol of propylene glycol-(1,2)
1.9 mol of trimethylolpropane
0.62 mol of phthalic acid anhydride
5.7 mol of adipic acid
Hydroxyl number: 165
Acid number: 6

EXAMPLE 10 (Comparison)

Polyester of
5 mol of isophthalic acid
6 mol of hexane-1,6-diol
Hydroxyl number: 80
Acid number: 2
Average functionality: 2
Average molecular weight: 1,360.
This polyester contained 54.5 mol-% of polyols and 45.5 mol-% of dicarboxylic acids.

EXAMPLE 11 (Comparison)

Polyester of
3 mol of isophthalic acid
2 mol of adipic acid
6 mol of hexane-1,6-diol
Hydroxyl number: 85
Acid number: 1
Average functionality: 2
Average molecular weight: 1,320.
This polyester contained 54.5 mol-% of polyols and 45.5 mol-% of dicarboxylic acids.

EXAMPLE 12 (Comparison)

Polyester of
4 mol of hexane-1,6-diol
1 mol of trimethylolpropane
4 mol of isophthalic acid
Hydroxyl number: 145
Acid number: 3
Average functionality: 3
Average molecular weight: 1,200.

This polyester contained 55.6 mol-% of polyols and 44.4 mol-% of dicarboxylic acids but contained no aliphatic dicarboxylic acid.

The following lacquer polyisocyanates are used in the Example 13 given:

Lacquer polyisocyanate A

Biuret polyisocyanate based on 1,6-diisocyanatohexane and containing a mixture of N,N',N''-tris-(isocyanatohexyl)-biuret and its higher homologues, 75% by weight solution in ethyl glycol acetate/xylene (volumetric ratio 1:1), isocyanate content of solution: 16.8% by weight, free 1,6-diisocyanatohexane content of the solution: below 0.7% by weight.

Lacquer polyisocyanate B

Polyisocyanate containing isocyanurate groups, based on 1,6-diisocyanatohexane and containing a mixture of N,N',N''-tris-(isocyanatohexyl)-isocyanurate and its higher homologues, 90% by weight solution in butyl acetate. Isocyanate content of solution: 21.7% by weight, free 1,6-diisocyanatohexane content of the solution: below 0.5% by weight.

EXAMPLE 13 (Use)

This example describes the preparation of lacquers based on the polyester polyols according to Examples 1 to 12, their application, and tests carried out on the resulting lacquer films. To simplify assessment of the individual samples of lacquer, only white lacquers were prepared. Various additives were introduced into the polyols from Examples 1 to 12 and the polyols were triturated with the pigment on a three-roll mixer.

Table 1 below shows the composition of the polyol triturations.

TABLE 1

| Component | % by weight |
|---|---|
| Polyester from Examples 1 to 12 | 21.1 |
| Solvent mixture of ethyl acetate, ethyl glycol acetate and methyl ethyl ketone 1:1:1 | 24.9 |
| Silicone oil as leveling agent ( ® Baysilonol OL, Bayer AG, Leverkusen, Germany, 10% in ethyl glycol acetate) | 0.4 |
| Zinc octoate (10% in ethyl glycol acetate) | 0.6 |
| Titanium dioxide (of the rutile type) | 19.8 |
| Agent for preventing settling ( ® Bentone of Kronos-Titan, Leverkusen, Germany) | 0.3 |

Polyisocyanates A and B were added to these pigment pastes in amounts which maintained an NCO/OH ratio of about 1.2:1. Additional solvent was added so that the lacquers contained about 33% by weight of binder, about 20% by weight of pigment and about 47% by weight of solvent.

The outflow time (DIN 53 211, 4 mm nozzle) was about 18 seconds. The lacquers were thus ready for spraying. When the products were kept in closed containers, the pot life was about 30 hours.

Samples of the lacquers adjusted to a consistency ready for spraying were sprayed on soft steel plates 0.5 mm in thickness and on plastic plates 3.5 mm in thickness and containing semi-rigid polyurethane integral foam (of the Bayflex type available from BAYER AG)

and cured for 20 minutes at 80° C. The resulting dry lacquer layers have a thickness of about 50 μm.

The individual lacquers carry the following symbols:
L 1 Polyester from Example 1+Polyisocyanate A
L 2 Polyester from Example 2+Polyisocyanate A
L 3 Polyester from Example 3+Polyisocyanate A
L 4 Polyester from Example 4+Polyisocyanate A
L 5a Polyester from Example 5+Polyisocyanate A
L 5b Polyester from Example 5+Polyisocyanate B
L 6a Polyester from Example 6+Polyisocyanate A
L 6b Polyester from Example 6+Polyisocyanate B
L 7 Polyester from Example 7+Polyisocyanate A
L 8 Polyester from Example 8+Polyisocyanate A
L 9 Polyester from Example 9+Polyisocyanate A
L 10 Polyester from Example 10+Polyisocyanate A
L 11 Polyester from Example 11+Polyisocyanate A
L 12 Polyester from Example 12+Polyisocyanate A Before the technical properties of the lacquer coats applied to the steel plates were tested, the coated plates were stored at room temperature for 8 days. The impact strength (ASTM-D 2794), König hardness (DIN 53 157) Gardner gloss at 60° C. (DIN 67 530) and adherence strength in cross cut (DIN 53 151) were then tested. Almost all samples gave excellent results in these tests. Leveling and appearance of the lacquer sample were also excellent and did not leave room for any differentiation. Tests in a weatherometer also showed the high quality of the lacquer samples. Only one exception was found in Lacquer samples L 10 and L 11 which lose their gloss and adherence after a short time. These samples also had insufficient hardness and solvent resistance. In addition, since the lacquers from which these samples were obtained were not stable in storage and, in particular, crystallized in the cold, they have not been included in further tests.

Other soft steel plates similarly coated with lacquers L 1 to L 9 and L 12 were subjected to a weathering test in Florida. For this test, the coated samples were placed at an angle of 45°. The change in gloss with time was assessed. The test was carried out without cleaning the plates, and the gloss was assessed according to Gardner at 60° at intervals of 3 months over a total period of 24 months. The results are summarized in Table 2.

TABLE 2

| Lacquer sample | Degree of gloss after | | | | | | | |
|---|---|---|---|---|---|---|---|---|
| | 0 | 3 | 6 | 9 | 12 | 15 | 18 | 21 | 24 months |
| L 1 | 95 | 90 | 86 | 80 | 75 | 70 | 68 | 62 | 50 |
| L 2 | 95 | 90 | 90 | 87 | 82 | 78 | 70 | 66 | 60 |
| L 3 | 96 | 88 | 80 | 77 | 70 | 65 | 60 | 56 | 45 |
| L 4 | 95 | 88 | 85 | 85 | 80 | 75 | 70 | 65 | 60 |
| L 5a | 96 | 90 | 85 | 85 | 80 | 80 | 80 | 60 | 60 |
| L 5b | 95 | 90 | 90 | 88 | 85 | 80 | 72 | 70 | 65 |
| L 6a | 96 | 90 | 90 | 85 | 80 | 75 | 70 | 70 | 60 |
| L 6b | 95 | 90 | 90 | 80 | 80 | 75 | 70 | 60 | 55 |
| L 7 | 96 | 90 | 85 | 80 | 73 | 70 | 60 | 55 | 50 |
| L 8 | 96 | 90 | 90 | 85 | 80 | 60 | 48 | 32 | 20 |
| L 9 | 96 | 30 | 15 | 10 | 10 | 5 | 5 | — | — |
| L 12 | 96 | 90 | 85 | 60 | 45 | 40 | 25 | 20 | 10 |

Discussion of the results of outdoor weathering in Florida.

Table 2 shows the astonishing gloss retention of the polyurethane lacquers according to the invention after two years' weathering. Only comparison lacquer L 8 gave a comparable result in the first part of the testing time, but this lacquer totally failed in the requirement for elasticity (see Table 3).

Weathered plates which had been coated with the lacquers according to the invention were washed after the test for gloss retention and the lacquer was investigated for its strength of adherence and its elasticity. The lacquers without exception showed virtually unchanged strength of adherence and elastic deformability.

To test the elasticity of the lacquer layers, samples 70 mm in length and 8 mm in width were first cut out of the coated plastics parts.

The test for elasticity was then carried out by means of a traction machine at various temperatures. The samples of plastics material were inserted in the clamps of this machine so that the free length between the clamps, which was the starting length, was 40 mm. To eliminate errors which were liable to occur during the elongation measurements due to samples flowing out of the clamps, the samples are marked at intervals of 40 mm. The speed of traction of the machine was 50 mm/min.

When visible damage to the lacquer occurred (e.g. formation of cracks or point damage), the traction test machine was immediately switched off and the distance between the marks was measured. The elongation to damage (in %) was calculated from the resulting change in length (Table 3). Five measurements were carried out at each temperature and the average given as the result.

TABLE 3

| Lacquer sample | Elongation in % of the initial length (40 mm) at | | | | |
|---|---|---|---|---|---|
| | −30° C. | −20° C. | 0° C. | +20° C. | +40° C. |
| L 1 | 31 | 53 | 80 | 92 | 80 |
| L 2 | 35 | 60 | 82 | 102 | 80 |
| L 3 | 25 | 47 | 62 | 87 | 75 |
| L 4 | 47 | 72 | 97 | 120 | 102 |
| L 5a | 55 | 97 | 138 | 158 | 132 |
| L 5b | 66 | 102 | 129 | 158 | 126 |
| L 6a | 47 | 94 | 129 | 160 | 123 |
| L 6b | 58 | 97 | 127 | 167 | 117 |
| L 7 | 62 | 97 | 137 | 170 | 128 |
| L 8 | — | — | 5 | 33 | 40 |
| L 9 | 20 | 18 | 23 | 55 | 50 |
| L 12 | 3 | 15 | 37 | 51 | 45 |

Discussion of the results of the elongation measurements at different temperatures:

The results demonstrate the special advantages of the lacquer coats produced from the lacquers according to the invention, in particular their high maximum of elasticity in the particularly important temperature range of 0° to 20° C. The elasticity of the lacquer coats produced according to the invention was a multiple of that obtained from lacquers L 8 and L 9 which were not according to the invention.

Although lacquer coats produced from lacquers L 1 and L 3 had slightly less elasticity than the coats produced from the other lacquers according to the invention, they were still markedly superior to the lacquer coat obtained from L 12 which was not according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having a hydroxyl number range of about 80 to 250 and which is reaction product of (a) 54–58 mol-% of a polyol component comprising (i) about 70 to 90 mol-% of hexane-1,6-diol and (ii) about 10 to 30 mol-% of at least one higher hydric alcohol selected from the group consisting of trimethylolpropane, glycerol, pentaerythritol and mixtures of these polyols, and (b) 42–46 mol-% of a dicarboxylic acid component comprising (iii) about 50 to 80 mol-% of isophthalic acid, (iv) about 20 to 30 mol-% of at least one dicarboxylic acid of the formula HOOC—(CH$_2$)$_n$—COOH, wherein n is an integer from 2 to 8, and (v) up to about 20 mol-% of at least one dicarboxylic acid or at least one dicarboxylic acid anhydride selected from the group consisting of terephthalic acid, phthalic acid, phthalic acid anhydride, tetrahydrophthalic acid, tetrahydrophthalic acid anhydride, hexahydrophthalic acid and hexahydrophthalic acid anhydride.

2. The polyester polyol of claim 1 wherein (ii) is trimethylolpropane, (iv) is adipic acid and (v) is phthalic acid and/or phthalic acid anhydride.

3. The polyester polyol of claim 1 wherein (i) plus (ii) equals 100 and (iii) plus (iv) plus (v) equals 100.

4. The polyester polyol of claim 2 wherein (i) plus (ii) equals 100 and (iii) plus (iv) plus (v) equals 100.

* * * * *